Patented Oct. 21, 1952

2,615,009

UNITED STATES PATENT OFFICE 2,615,009

PROCESS FOR EMULSION POLYMERIZATION AT LOW TEMPERATURES

Willard M. St. John, Jr., and Carl A. Uraneck, Borger, Tex., assignors to Phillips Petroleum Company, a corporation of Delaware No Drawing. Application April 18, 1949, Serial No. 88,232

17 Claims. (Cl. 260—83.7)

This invention relates to an improved process for polymerizing unsaturated organic compounds while dispersed in an aqueous emulsion. In one embodiment this invention relates to the use of subfreezing polymerization temperatures and aqueous media which contain a large quantity of a salt dissolved therein.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, maganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide, formally known as dimethylphenylhydroperoxymethane. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, an emulsifying agent such as a soap, or other known emulsifying agents, and various other ingredients which improve the qualities of the resulting latex or of the final rubber product.

When carrying out emulsion polymerization reactions at low temperatures it is necessary that a reaction medium be employed which will remain fluid throughout the reaction period. Heretofore when it has been desired to effect polymerizations at temperatures near or below 0° C., systems comprising aqueous solutions containing substantial amounts of organic materials such as alcohols, for example, methanol, glycerol, glycol, and the like, have been provided.

We have now found that expensive, and difficultly recoverable, organic compounds need not be used to suppress the freezing point of water but that inexpensive materials such as common salt, sodium chloride, can be used as solutes in the aqueous medium. One of the methods heretofore used in the coagulation of latices has been the brine-acid method, in which a concentrated aqueous solution of common salt is added to a latex to effect a coagulation, or a creaming, of the latex. It has, therefore, been surprising to find that a satisfactory latex can be produced and efficient polymerization effected when a salt is used to prevent the freezing of the aqueous phase in low-temperature emulsion polymerization. We have discovered an additional beneficial effect in this connection, in that polymer modifiers can be successfully used under these conditions which could not be successfully used under polymerization conditions heretofore known. Thus, we have found that we can use a mercaptan of low molecular weight, such as a butyl mercaptan, as a polymer modifier when a concentrated aqueous salt solution is used at low temperatures as the aqueous medium in emulsion polymerization, whereas it has been stated that a butyl mercaptan will completely stop the polymerization reaction when used under ordinary conditions.

An object of this invention is to polymerize unsaturated organic compounds while dispersed in an aqueous emulsion.

Another object of this invention is to provide an improved process for the production of synthetic rubber.

Still another object of our invention is to produce synthetic rubber at a low reaction temperature.

Further objects and advantages of our invention will become apparent, to one skilled in the art, from the accompanying disclosure and discussion.

The process of this invention has numerous advantages. As hereinbefore stated, it is no longer necessary to use an organic material as one of the components of the dispersion medium when it is desired to carry out emulsion polymerizations at low temperatures. While the alcohol-water emulsions ordinarily employed produce satisfactory results, the cost of the alcohol is sufficiently great that a method for its recovery must be provided if the process is to be economically attractive. In some instances recovery of the alcoholic component is difficult and in any case it necessitates additional equipment and an expenditure of time. These difficulties are eliminated when using a high salt aqueous medium as herein described. In the present process both anionic and nonionic emulsifiers are applicable. Various initiator systems may be employed and even uncomplexed ferrous salts such as ferrous sulfate may be used in redox recipes wherein the oxidant is an organic peroxidic material. The rate of reaction is governed by the salt system and the emulsifying agent employed as well as by the activator used. In some instances more rapid reaction rates are realized when operating in a high salt aqueous medium than when similar recipes are employed using alcohol-water systems.

Any electrolyte which functions satisfactorily as a freezing point depressant and does not markedly inhibit polymerization or produce deleterious effects on the product is applicable for the production of high-salt aqueous media used in the practice of this invention. Since lower temperatures can be obtained with some salts than with others, the choice of the salt employed is frequently determined by the temperature at which polymerization is to take place. In other instances where a number of salts might be found applicable, the choice is governed by other factors, such as the polymerization recipe employed, the effects produced by a particular electrolyte, etc. Materials ordinarily used are alkali and alkaline earth metal salts, and ammonium salts, which are of sufficient solubility at low temperatures to give an aqueous medium of the freezing point desired. Chlorides, nitrates, and sulfates of these metals are most frequently preferred, particularly the chlorides of sodium, potassium, calcium, magnesium, and ammonium chloride. Highly soluble salts of organic acids of low molecular weight can also be used, such as salts of formic, acetic, propionic and butyric acids, and especially the potassium salts.

The amount of salt employed in the preparation of a high-salt aqueous medium is variable and is determined by the salt chosen and by other factors, such as the operating temperature and the polymerization recipe. In general the concentration of salt should be such that the freezing point of the aqueous medium is lower than the temperature of the heat exchange medium used to remove the heat of reaction, so that freezing will not take place when the emulsion is in contact with colder heat-exchange equipment, which will usually be below the freezing point of water. Some salts tend to have some inhibiting effects with some recipes but not with others, and at very low temperatures some salts will not be sufficiently soluble to be present in high enough concentration. Based upon the weight of water, the amount of salt will usually be at least 10 percent and will not exceed 30 percent, and usually it will not be greater than 25 percent. In some instances, of course, the solubility of a salt will not permit a concentration as high as 25 percent and in other cases, regardless of solubility, the desired effects are produced with solutions of lower concentration.

Emulsifying agents which are applicable are those which will remain soluble and perform the function of surface active agents in the concentration of salt chosen, that is, in the high-salt aqueous medium employed. Both anionic and nonionic types of emulsifying agents are suitable and give satisfactory results in polymerization ractions of the type described. The anionic emulsifiers most generally employed are soluble salts of the short chain or low molecular weight organic acids, i. e., compounds containing six to ten carbon atoms per molecule, such as sodium and potassium salts of capric acid, caprylic acid, caproic acid, sodium hexyl sulfate, and the like. Examples of nonionic emulsifiers include alkylated aryl polyether alcohols, sorbitan monolaurate, sorbitan monopalmitate, sorbitan monooleate, lecithin, and other materials which behave in a similar manner. The amount of emulsifying agent will generally be between about one and about ten parts by weight per 100 parts of monomeric material.

The monomeric material polymerized to produce polymers by the process of this invention comprises unsaturated organic compounds which undergo an addition polymerization in aqueous emulsion to form linear polymers of high molecular weight, and which generally contain the characteristic structure $CH_2=C<$ and also, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinyl naphthalene and similar dirivatives thereof, and the like; acrylic and substituted acrylic acids and their esters, nitriles and amides such as acrylic acid, methacrylic acid, methyl acrylate, ethyl acrylate, methyl alpha-chloracrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefor, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil-in-water" type, with the ratio of aqueous medium to monomeric material between about 1:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The temperature at which polymerizations are carried out in accordance with out invention are usually below about 5° C. In general, it is found that the lower the polymerization temperature the better the characteristics of the resulting synthetic rubber product, providing that the recipe is sufficiently active to produce a sufficient extent of conversion within a permissible reaction time. Since, as is well known for all chemical reactions, the rate of reaction is slower at lower temperatures, it will usually not be feasible to conduct reactions below about —40° C., and satisfactory operation is more usually obtained between about —20 and 0° C.

In effecting emulsion polymerization of a monomeric material in accordance with our invention, particularly when a batch-type or semi-batch-type operation is carried out, the reactor is preferably first charged with the aqueous medium, which contains the desired emulsifying agent and the oxidant, and the monomeric material is then admixed with agitation of the contents. At the same time a reaction modifier, such as a mercaptan, is also included, usually in solution in at least a part of the monomeric material. An activator solution is separately added to the reaction mixture, and reaction then proceeds. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As will be illustrated hereinafter by the examples, a polymeric product is usually produced by polymerizing the original monomeric material to an extent of only about 50 to 70 per cent of total conversion, and such a conversion can usually be obtained within a period with an average reaction time of about 5 to about 30 hours.

The mercaptans which can be used as polymer modifiers in practicing the process of this invention may be aryl or alkyl mercaptans. As will be illustrated by examples, one of the benefits of polymerizing monomeric materials at low temperatures by the process of our invention is that satisfactory modification of the polymer and satisfactory reaction rates can be obtained with alkyl mercaptans of low molecular weight. The mercaptans used will generally contain three to sixteen carbon atoms per molecule. Mixtures or blends of mercaptans are also frequently considered desirable and in many cases are preferred to the pure compounds. The amount of mercaptan employed will vary, depending upon the particular mercaptan compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. Also, in general, mercaptans having low molecular weights are very effective as modifiers when employed in the recipes of this invention whereas in some other types of polymerization recipes they behave as serious inhibitors or retarders. In the case of tertiary mercaptans, such as tertiary $C_{12}$ mercaptan, blends of tertiary $C_{12}$, $C_{14}$, and $C_{16}$ mercaptans, and the like, modification is obtained with 0.05 to 0.3 part mercaptan per 100 parts monomers, but smaller or larger amounts may be employed in some instances. In fact, amounts as large as 2 parts per 100 parts of monomers may be used. Thus the amount of mercaptan is adjusted to suit the case at hand.

Among the interesting and novel characteristics of the polymerization system used in the practice of our invention are the physical characteristics and behavior of the resulting latices. When certain emulsifiers, such as caprylates and some alkyl sulfates, are employed, coagulation of the latices is effected by the addition of water alone. In fact, the polymer has a tendency to precipitate as it is formed. In other cases, such as when nonionic emulsifiers are employed, the latices might be coagulated by a conventional laboratory procedure, i. e., by addition of acid or alcohol. A property inherent in nonionic compounds can also be applied when coagulating latices prepared in the presence of nonionic emulsifiers. This property is the reversible solubility of these compounds in water. Thus latices emulsified with nonionic emulsifiers may be coagulated merely by heating to 160° F., preferably in the presence of steam. Obviously the method of coagulating a particular latex is chosen to suit the case at hand.

In connection with the foregoing, it has been found that even after 35 minutes of reaction (about 10 per cent conversion) visual examination of the latex indicates that some polymer had precipitated and that, as polymerization continued, a more or less thixotropic mixture was formed. This precipitation indicates that quite possibly the polymer formed is somewhat homogeneous as regards molecular weight, since it is assumed that once the polymer is precipitated and suspended in solution, it can no longer react. In this instance the emulsifying agent used was such that, after the desired extent of polymerization had been completed, the addition of water was sufficient to coagulate the latex.

Another interesting feature is the fact that mobile emulsions, or latices, can frequently be obtained with a smaller amount of aqueous medium than is possible otherwise. As previously stated, and as will be illustrated in Example 9, the ratio of aqueous medium to monomeric material can be as low as about 1:1. It is often desirable to produce a latex having a high solids content, and one of the advantages of our invention is that this can be readily accomplished. Much of the salt, which may at times be objectionable, can be easily removed, as by subjecting the latex to centrifuging to separate a major portion of the aqueous medium. Even with such emulsifying agents as alkylated aryl ether alcohols, an adequate separation has been obtained in this manner.

Advantages of this invention are illustrated by the following examples. The reactants, and their proportions, and the other specific ingredients of the recipes are presented as being typical and should not be construed to limit the invention unduly. In these recipes the parts are parts by weight per 100 parts by weight of monomeric material, whether expressed directly or in units based upon molecular weight, as in millimols. The same units of weight should, of course, be used throughout, i. e. when the monomeric material is measured in pounds the other ingredients are also measured in pounds or in millipound mols.

*Example 1*

Copolymerization of butadiene with styrene in an aqueous medium containing sodium chloride and using a salt of a low molecular weight fatty acid as the emulsifying agent was carried out according to the following recipe:

|  | Parts by weight |
|---|---|
| Butadiene | 70 |
| Styrene | 30 |
| Water | 200 |
| Sodium chloride | 34.7 |
| Potassium caprylate | 10.0 |
| Cumene hydroperoxide, 100% | 0.167 (1.1 millimols) |
| Ferrous sulfate, $FeSO_4.7H_2O$ | 0.278 (1.0 millimol) |
| Sodium pyrophosphate, $Na_4P_2O_7.10H_2O$ | 0.446 (1.0 millimol) |
| Mercaptan blend [1] | 0.25 |

[1] A blend of tertiary $C_{12}$, $C_{14}$, and $C_{16}$ aliphatic mercaptans in a ratio of 3:1:1 parts by weight.

The activator was prepared by heating the ferrous sulfate, sodium pyrophosphate, and 25 parts water at 60° C. for 40 minutes. The mixture was protected from the air by a blanket of nitrogen.

Polymerization was carried out at −10° C. using the conventional technique. A conversion of 61 per cent was reached in 4.6 hours. The rubber was recovered from the latex, stabilized with antioxidant, and dried in the usual way.

*Example 2*

The following recipe was employed for preparing a butadiene-styrene copolymer:

|  | Parts by weight |
|---|---|
| Butadiene | 70 |
| Styrene | 30 |
| Water | 200 |
| Calcium chloride, anhydrous | 38 |
| Alkylated aryl polyether alcohol [1] | 10 |
| Sodium salt of condensed alkyl aryl sulfonic acid [2] | 0.50 |
| Cumene hydroperoxide, 100% | 0.167 (1.1 millimols) |
| Mercaptan blend [3] | 0.25 |
| Ferrous sulfate, $FeSO_4.7H_2O$ | 0.278 (1.0 millimol) |
| Sodium pyrophosphate, $Na_4P_2O_7.10H_2O$ | 0.446 (1.0 millimol) |

[1] Triton N–100.
[2] Daxad–11.
[3] See Example 1.

The activator was prepared and polymerization carried out at −10° C. according to the procedure given in Example 1. The latex was fluid and contained no prefloc. A conversion of 82 per cent was reached in 48 hours.

*Example 3*

The recipe of Example 1 was repeated to confirm the excellent rate originally obtained. Ten parts of potassium caprylate was employed as the emulsifying agent. Polymerization was effected at −10° C. A conversion of 61 per cent was reached in 5.2 hours.

*Example 4*

The recipe of Example 1 was followed except that 10.0 parts sodium hexyl sulfate was employed as the emulsifying agent. Polymerization was effected at −10° C. A conversion of 57 per cent was reached in 23.7 hours.

*Example 5*

The recipe of Example 1 was followed for carrying out three polymerization runs at −10° C. except for the emulsifying agent. Sorbitan monolaurate was used in run I, sorbitan monopalmitate in run II, and sorbitan monooleate in run III. The following results were obtained:

| Run No. | Time, Hours | Conversion, Percent |
|---|---|---|
| I | 25 | 63 |
| II | 25 | 56 |
| III | 25 | 60 |

*Example 6*

Copolymerization of butadiene with styrene in a potassium chloride-water medium was effected at −10° C. with uncomplexed ferrous sulfate as the activator. The following recipe was employed.

|  | Parts by weight |
|---|---|
| Butadiene | 70 |
| Styrene | 30 |
| Water | 200 |
| Potassium chloride | 45.9 |
| Alkylated aryl polyether alcohol [1] | 5.0 |
| Cumene hydroperoxide, 100% | 0.167 (1.1 millimols) |
| Mercaptan blend [2] | 0.25 |
| Ferrous sulfate, $FeSO_4.7H_2O$ | 0.278 (1.0 millimol) |

[1] Triton N–100.
[2] See Example 1.

A conversion of 9.3 per cent was obtained in 72.2 hours.

Example 7

The following data show the applicability of tertiary butyl mercaptan as a modifier for polymerization reactions, in the process of this invention. The following salt antifreeze recipe was employed.

| | Parts by weight |
|---|---|
| Butadiene | 70 |
| Styrene | 30 |
| Water | 200 |
| NaCl | 34.7 |
| Potassium caprylate (100% neutralized) | 10.0 |
| Cumene hydroperoxide (69.7%) | 0.24 |
| $FeSO_4.7H_2O$ | 0.278 |
| $Na_4P_2O_7.10H_2O$ | 0.446 |
| Potassium chloride | 0.40 |
| Tertiary butyl mercaptan | Variable |
| Temperature ° C. | —10 |

The activator solution was prepared by heating the ferrous sulfate, sodium pyrophosphate, potassium chloride, and 12.5 parts water at 60° C. for 40 minutes. The mixture was protected from the air by a blanket of nitrogen.

Polymerization was carried out using the conventional technique. The time-conversion data obtained using different amounts of tertiary butyl mercaptan are shown in the table which follows. Mooney values are also included.

| Tert. butyl Mercaptan, Parts | Time, Hours | Conversion, Percent | Mooney (ML-4) |
|---|---|---|---|
| 0.00 | 15.8 | 66 | 167 |
| 0.05 | 10.7 | 63 | 135 |
| 0.10 | 11.3 | 62 | 106 |
| 0.15 | 11.4 | 58 | 55 |
| 0.20 | 15.6 | 67 | 83 |
| 0.25 | 15.7 | 67 | 75 |
| 0.30 | 16.3 | 63 | 47 |
| 0.35 | 16.4 | 65 | 34 |
| 0.40 | 16.7 | 59 | 26 |

The results show that 0.05 part tertiary butyl mercaptan accelerates the reaction while higher concentrations produce a retarding effect. One result, at 0.15 part mercaptan, is out of line. The addition of 0.40 part tertiary butyl mercaptan lowered the Mooney value from 167 to 26. The rubber produced at 26 Mooney appeared to have exceptional properties. It had high cohesion and its tack was considerably more pronounced than that of rubber produced when a salt of a rosin acid is used as an emulsifying agent. It could be extended in a thin tight film which resembled films obtained with slightly modified samples.

Example 8

The addition product obtained by the interaction of tertiary hexadecyl mercaptan with ethylene oxide was employed as the emulsifying agent in the following polymerization recipe:

| | Parts by weight |
|---|---|
| Butadiene | 70 |
| Styrene | 30 |
| Water | 200 |
| NaCl | 34.7 |
| Emulsifier | 5.0 |
| Mercaptan blend [1] | 0.25 |
| Cumene hydroperoxide, 100% | 0.167 (1.1 millimols) |
| Activator: | |
| $FeSO_4.7H_2O$ | 0.278 (1.0 millimol) |
| $Na_4P_2O_7.10H_2O$ | 0.446 (1.0 millimol) |
| KCl | 0.4 |

[1] See Example 1.

The activator was prepared by heating the ferrous sulfate, sodium pyrophosphate, and potassium chloride, in sufficient water to make 25 ml. of solution, at a temperature of 60° C. for 40 minutes.

Polymerization was effected at —10° C. The following time-conversion data were obtained:

| Time, Hours | Conversion, Percent |
|---|---|
| 16.9 | 22 |
| 23.9 | 26 |
| 43 | 50 |

Example 9

The variation of water content in two polymerization systems was investigated using two different emulsifier-electrolyte combinations. The following recipe was employed:

| | Part by weight |
|---|---|
| Butadiene | 70 |
| Styrene | 30 |
| Emulsifier | 10.0 |
| Electrolyte, to give —10° C. freezing point | |
| Water | Variable |
| Mercaptan blend [1] | 0.25 |
| Cumene hydroperoxide, 100% | 0.167 (1.1 millimols) |
| Activator: | |
| $FeSO_4.7H_2O$ | 0.278 (1.0 millimol) |
| $Na_4P_2O_7.10H_2O$ | 0.446 (1.0 millimol) |
| KCl | 0.4 |

[1] See Example 1.

Polymerization was effected at —10° C. as in the preceding examples. The data are herewith presented:

| Emulsifier, 10 Parts | Electrolyte Kind | Electrolyte Parts | Water, Parts | Conversion, Percent 4.8 hrs. | 9.7 hrs. | 24.3 hrs. |
|---|---|---|---|---|---|---|
| K caprylate | NaCl | 17.4 | 100 | 71 | | |
| Do | NaCl | 21.8 | 125 | 66 | | |
| Do | NaCl | 26.1 | 150 | 63 | | |
| Do | NaCl | 30.4 | 175 | 63 | | |
| Do | NaCl | 34.8 | 200 | 60 | | |
| Na hexyl sulfate | $CaCl_2$ | 19.0 | 100 | 9 | 10 | 19 |
| Do | $CaCl_2$ | 23.8 | 125 | 16 | 26 | 45 |
| Do | $CaCl_2$ | 28.5 | 150 | 19 | 27 | 45 |
| Do | $CaCl_2$ | 33.2 | 175 | 20 | 27 | 42 |
| Do | $CaCl_2$ | 38.0 | 200 | 20 | 24 | 37 |

At higher conversions very little, if any, free liquid is present in cases where the smaller amounts of water are used. The products consist of large, dry appearing, solid particles of water-polymer agglomerate. Other latices assumed the consistency of a thick paste as the amount of water in the system was increased.

Example 10

The recipe of Example 9 was followed with 100 parts of water and 17.4 parts NaCl being present in the system. The amount of emulsifier, potassium caprylate, was varied from 5.0 to 10.0 parts. Polymerization was effected at —10° C. The results obtained were as follows:

| K Caprylate, Parts | Conversion, Percent, 4.8 Hours |
|---|---|
| 5.0 | 36.0 |
| 6.5 | 42.5 |
| 8.0 | 58.3 |
| 10.0 | 78.3 |

All the latices were agglomerated with little free liquid present. They were precipitated on dilution with water.

*Example 11*

Two polymerization runs were carried out using the recipe of Example 9 with potassium caprylate as the emulsifier and with different amounts of water and sodium chloride. In each case 2.0 parts of an alkylated aryl polyether alcohol (Triton N–100) was added to determine the effect on fluidity of the latex. The data are tabulated below:

| K Caprylate, Parts | $H_2O$, Parts | NaCl, Parts | Conversion, Percent, 4.8 Hours | Latex |
|---|---|---|---|---|
| 10.0 | 100 | 17.4 | 64.5 | Agglomerated. |
| 10.0 | 200 | 34.8 | 49.0 | Fluid. |

*Example 12*

Two parallel runs were made using the potassium caprylate recipe with 34.8 parts sodium chloride and 200 parts water as given in Example 9. Diisopropylbenzene hydroperoxide (0.327 part of 74.3%) was substituted for the cumene hydroperoxide (1.25 millimols in each case). Polymerization was carried out at −10° C. The following results were obtained.

| Hydroperoxide | Conversion, Percent, 4.8 Hours |
|---|---|
| Diisopropylbenzene | 56.3 |
| Cumene | 54.5 |

Two similar parallel runs were made in which 34.8 parts sodium chloride and 200 parts water were employed with sodium hexyl sulfate as the emulsifier. Results with the two hydroperoxides are given below:

| Hydroperoxide | Conversion, Percent, 17.3 Hours |
|---|---|
| Diisopropylbenzene | 46.9 |
| Cumene | 43.7 |

*Example 13*

A sodium chloride-potassium caprylate recipe was employed using different modifiers. The recipe was as follows:

| | |
|---|---|
| Butadiene | 70 parts by weight |
| Styrene | 30 parts by weight |
| Water | 200 parts by weight |
| Sodium chloride | 34.7 parts by weight |
| Potassium caprylate, 100% neutralized | 10.0 parts by weight |
| Modifier | 0.25 parts by weight |
| Cumene hydroperoxide, 100% | 0.167 parts by weight (1.1 millimols) |
| Activator: | |
| $FeSO_4.7H_2O$ | 0.278 parts by weight (1.0 millimol) |
| $Na_4P_2O_7.10H_2O$ | 0.446 parts by weight (1.0 millimol) |
| KCl | 0.40 parts by weight |
| Temperature | −10° C. |

| Modifier | Time, Hours | Conversion, Percent | Mooney Value, ML–4 |
|---|---|---|---|
| Tert.-$C_6$ Mercaptan | 7 | 59.9 | 44 |
| Tert.-$C_8$ Mercaptan | 4.8 | 57 | >200 |
| Tert.-$C_{12}$ Mercaptan | 4.8 | 57 | >200 |
| Mercaptan Blend [1] | 5.3 | 51.5 | >200 |

[1] See Example 1.

These results show that high modifier contents will be necessary with this type of recipe.

Two additional runs were made using 1.0 and 2.0 parts tertiary $C_8$ mercaptan. In the first case a conversion of 71 per cent was obtained in 7.7 hours and the polymer had a Mooney value of 67. In the second case the 7.7-hour conversion was 67 per cent and the Mooney value was 31.

*Example 14*

An alkylated aryl polyether alcohol was employed as the emulsifier in the following recipe:

| | Parts by weight |
|---|---|
| Butadiene | 70 |
| Styrene | 30 |
| Water | 200 |
| Calcium chloride | 38.0 |
| Alkylated aryl polyether alcohol [1] | 10 |
| Cumene hydroperoxide, 100% | 0.167 (1.1 millimols) |
| Activator: | |
| $FeSO_4.7H_2O$ | 0.278 (1.0 millimol) |
| $Na_4P_2O_7.10H_2O$ | 0.446 (1.0 millimol) |
| KCl | 0.4 |
| Tertiary $C_{12}$ mercaptan | 0.25 |

[1] Triton N–100.

Polymerization was effected at −10° C. A conversion of 62 per cent was reached in 18.7 hours. The polymer had a Mooney value (ML–4) of 28.

A series of runs was carried out using the same recipe except that different amounts of tertiary $C_8$ mercaptan were used as the modifier. The data are tabulated below:

| Tert. $C_8$ Mercaptan, Parts | Time, Hours | Conversion, Percent | ML–4 |
|---|---|---|---|
| 0.10 | 18.3 | 54 | 89 |
| 0.15 | 18.3 | 53 | 64 |
| 0.20 | 18.3 | 54 | 48 |
| 0.25 | 18.3 | 54 | 39 |
| 0.30 | 18.3 | 54 | 32 |

These results contrast greatly with the Mooney values obtained with the potassium caprylate-sodium chloride system thereby indicating that the type of emulsifier employed has a large influence on modification.

*Example 15*

Variable quantities of tertiary $C_6$ mercaptan were employed in a series of polymerizations carried out at −10° C. using the recipe of Example 13. The results were as follows:

| Tert. C₆ Mercaptan, Parts | Time, Hours | Conversion, Percent | ML-4 |
|---|---|---|---|
| 0.35 | 6.8 | 56 | 17 |
| 0.30 | 6.7 | 52 | 24 |
| 0.25 | 6.2 | 57 | 35 |
| 0.20 | 6.1 | 55 | 52 |
| 0.15 | 5.9 | 56 | 92 |
| 0.10 | 5.1 | 53 | 151 |

Example 16

As is shown by the following data, salts of fatty acids of low molecular weight can also be used successfully to lower the freezing point of the aqueous emulsion. Polymerization was effected at −10° C., using the following recipe.

|  | Parts by weight |
|---|---|
| Butadiene | 70 |
| Styrene | 30 |
| Water | 200 |
| Sodium acetate | 43.4 |
| Potassium caprylate | 5.0 |
| Mercaptan Blend [1] | 0.25 |
| Cumene Hydroperoxide, 100% | 0.167 (1.1 millimols) |
| Activator: | |
|   FeSO₄.7H₂O | 0.278 (1.0 millimol) |
|   Na₄P₂O₇.10H₂O | 0.446 (1.0 millimol) |
|   KCl | 0.4 |

[1] See Example 1.

The activator solution was prepared as in Example 8. The following time-conversion data were obtained:

| Hours | Percent Conversion |
|---|---|
| 4.4 | 7 |
| 9.2 | 13 |
| 24.8 | 35 |

In another run with a recipe using 5.0 parts of sodium hexyl sulfate as emulsifier but otherwise the same as that just given, 15 per cent conversion was obtained in 25 hours.

Example 17

A series of runs was made to produce a series of samples of synthetic rubber so that the properties of the rubber could be tested and compared. Six samples of rubber were so produced, each at −10° C. The first four samples were prepared using the following recipe, with variations in the kind and amount of mercaptan modifier, as listed in the following table.

|  | Parts by weight |
|---|---|
| Butadiene | 70 |
| Styrene | 30 |
| Water | 200 |
| Sodium chloride | 34.7 |
| Potassium caprylate, 100% neutralized | 10.0 |
| Mercaptan | Variable |
| Cumene hydroperoxide, 100% | 0.167 (1.1 millimols) |
| Ferrous sulfate, FeSO₄.7H₂O | 0.278 (1.0 millimol) |
| Sodium pyrophosphate, Na₄P₂O₇.10H₂O | 0.446 (1.0 millimol) |
| Potassium chloride | 0.40 |

Sample 5 was prepared with a similar recipe, using an alkylated aryl polyether alcohol (Triton N-100) as the emulsifying agent and also with 38.0 parts anhydrous calcium chloride being substituted for the 34.7 parts sodium chloride in the above recipe. Sample 6 was prepared as a "control," using the following recipe in which methanol is present in the aqueous phase. All polymerizations were carried out at −10° C.

|  | Parts by weight |
|---|---|
| Butadiene | 71 |
| Styrene | 29 |
| Water | 180 |
| Methanol | 40 |
| Potassium laurate, pH 9.5 | 5.0 |
| Cumene hydroperoxide, 100% | 0.21 (1.33 millimols) |
| Mercaptan blend [1] | 0.115 |
| Potassium chloride | 0.4 |
| Sodium pyrophosphate, anhydrous | 0.3 (1.1 millimols) |
| Ferrous sulfate, FeSO₄.7H₂O | 0.31 (1.1 millimols) |
| Sodium hypophosphite, NaH₂PO₂.H₂O | 0.08 |
| Sodium salt of condensed alkyl aryl sulfonic acid [2] | 0.1 |

[1] A blend of tertiary C₁₂, C₁₄, and C₁₆ aliphatic mercaptans in a ratio of 3:1:1 parts by weight.
[2] Daxad-11.

The activator was prepared by the addition of the ferrous sulfate, dissolved in 3 parts water, to a solution prepared by dissolving the sodium pyrophosphate and sodium hypophosphite in 15 parts water. The Daxad-11 and potassium chloride were then added and the mixture heated to 60° C. and cooled immediately.

The water, methanol, and emulsifying agent were charged to the reactor and the mixture cooled to reaction temperature after which the activator was charged. The mercaptan dissolved in the styrene was then introduced, followed by the butadiene and finally the cumene hydroperoxide.

The polymers, prepared as above described, were compounded according to the following recipe:

|  | High Salt Aqueous Medium Polymers | "Control" |
|---|---|---|
| Polymer | 100 | 100 |
| Carbon black [1] | 50 | 50 |
| Zinc oxide | 3 | 3 |
| Asphalt softener | 6 | 6 |
| Stearic acid | 2 |  |
| Sulfur | 1.75 | 1.75 |
| N-cyclohexyl-2-benzothiazylsulfenamide | 0.60 | 0.60 |

[1] A special, furnace type, high modulus carbon black.

The mixes were milled and cured at 307° F. for varying lengths of time and physical properties determined at equal states of cure as measured by compression set.

The polymer samples evaluted are designated as follows:

| Sample No. | Type Modifier | Parts | Emulsifier |
|---|---|---|---|
| 1 | Mercaptan blend | 0.25 | K Caprylate. |
| 2 | tert-C₆ mercaptan | 0.2 | Do. |
| 3 | do | 0.25 | Do. |
| 4 | tert-C₄ mercaptan | 0.35 | Do. |
| 5 | tert-C₈ mercaptan | 0.175 | Triton N-100. |
| 6 | Mercaptan blend | 0.115 | K Laurate. |

A summary of the data is herewith presented.

|  | Sample No. | | | | | |
|---|---|---|---|---|---|---|
|  | 1 | 2 | 3 | 4 | 5 | 6 |
| Mooney, raw, ML-4 | >200 | 65 | 44 | 28 | 73 | 63 |
| Mooney, compounded, MS-1½ | 92.5 | 47 | 40.5 | 27 | 46 | 51 |
| Minutes cure at 18.5% compression set | 18 | 31 | 32 | 37 | 28 | 28 |
| Stress-strain properties at 80° F.: | | | | | | |
| 300% modulus, p. s. i | 3,600 | 1,370 | 1,430 | 850 | 1,120 | 1,980 |
| Tensile, p. s. i | 4,500 | 3,960 | 3,800 | 2,800 | 3,720 | 4,110 |
| Elongation, percent | 340 | 600 | 590 | 690 | 690 | 530 |
| Stress-strain properties at 200° F.: | | | | | | |
| Tensile, p. s. i | 2,580 | 1,840 | 1,540 | 1,280 | 2,120 | 1,840 |
| Elongation, percent | 200 | 355 | 370 | 485 | 485 | 300 |
| Hysteresis, ΔT, °F | [1]67.6 | 82.5 | 84.5 | 111.9 | [1]81.1 | [1]63.8 |
| Resilience, percent | 70.4 | 61.4 | 60.4 | 51.5 | 58.5 | 60.5 |
| Flex life at 210° F., thousands of flexures to failure | [1]0.9 | 24.8 | 18.3 | 29.3 | [1]70.0 | [1]23.0 |
| Extrusion at 250° F.: | | | | | | |
| Inches/minute | ([2]) | 33.0 | 35.7 | 43.7 | 43.2 | 30.6 |
| Grams/minute | ([2]) | 87.7 | 92.0 | 87.2 | 105.7 | 78.0 |

OVEN AGED 24 HOURS AT 212° F.

|  | Sample No. | | | | | |
|---|---|---|---|---|---|---|
|  | 1 | 2 | 3 | 4 | 5 | 6 |
| Stress-strain properties at 80° F.: | | | | | | |
| 300% modulus, p. s. i | ------ | 2,460 | 2,320 | 1,460 | 2,110 | 3,080 |
| Tensile, p. s. i | 3,470 | 3,930 | 3,430 | 2,740 | 3,960 | 3,760 |
| Elongation, percent | 270 | 430 | 420 | 510 | 495 | 370 |
| Hysteresis, ΔT, °F | [1]70.8 | 67.2 | 68.5 | 77.4 | [1]71.2 | [1]56.8 |
| Resilience, percent | 70.8 | 65.0 | 66.2 | 57.0 | 65.1 | 67.2 |
| Flex life at 210° F., thousands of flexures to failure | <0.1 | 50.0 | 48.0 | 10.7 | [1]118.6 | 10.0 |

[1] 30 minute cure.
[2] Would not extrude.

The 200 ML-4 rubber cured very rapidly, had a high tensile, low elongation, low hysteresis, and high resilience. The tertiary-$C_6$ and tertiary-$C_8$ modified elastomers cured essentially at the same rate as the control (sample No. 6) while the tertiary-$C_4$ modified sample cured slower. The tertiary-$C_6$ modified elastomers had about equal original flex life to the control but much higher aged flex life. The teritary-$C_4$ modified rubber was similar in flex life to the control while the Triton N-100 emulsified product was very significantly better in flex life, both original and aged. All samples prepared in the high salt aqueous medium extruded at a faster rate than the control, except for the 200 Mooney product.

*Example 18*

An aqueous solution of sodium chloride was used as the aqueous medium in a recipe using a diazothioether as a polymerization initiator, in the following recipe.

| | Parts by weight |
|---|---|
| Butadiene | 70 |
| Styrene | 30 |
| Water | 200 |
| Sodium chloride | 34.7 |
| K caprylate | 10 |
| $Na_3PO_4.12H_2O$ | 0.5 |
| 2-(4-methoxybenzenediazomercapto)-naphthalene | 0.3 |
| $K_3Fe(CN)_6$ | 0.3 |
| Mercaptan Blend [1] | 0.25 |
| n-$C_{16}$ mercaptan | 1.0 |
| KOH | 0.1 |

[1] See Example 1.

The reaction was carried out at −10° C., with 1.5 per cent conversion in 6.9 hours and 5 per cent conversion in 24 hours. Although this is slower than usual, a definite and steady polymerization was obtained.

*Example 19*

A series of runs was made using different oxidants. The following recipe was employed:

| | Parts by weight |
|---|---|
| Butadiene | 70 |
| Styrene | 30 |
| Water | 200 |
| Potassium caprylate | 10 |
| Sodium chloride | 34.7 |
| Oxidant | Variable (1.25 millimols) |
| $FeSO_4.7H_2O$ | 0.278 (1.0 millimol) |
| $Na_4P_2O_7.10H_2O$ | 0.446 (1.0 millimol) |
| KCl | 0.4 |

The following table shows the oxidant employed together with the time-conversion data obtained:

|  | Conversion, Percent | | | |
|---|---|---|---|---|
|  | 2.4 Hrs. | 4.6 Hrs. | 7.3 Hrs. | 26.4 Hrs. |
| Tertiary butyl perbenzoate | 6 | ------ | 23 | 60 |
| Tertiary butyl permaleic acid | 6 | ------ | 20 | 51 |
| Tertiary butyl perphthalic acid | 5 | ------ | 15 | 50 |
| Tertiary butyl hydroperoxide | 4 | ------ | 22 | 58 |
| Di-tert-butyl diperphthalate | 7 | ------ | 26 | 59 |
| Dibenzal diperoxide | 2 | ------ | 26 | ------ |
| Hydroxyheptyl peroxide | | | 3 | 15 |
| Methylcyclohexane hydroperoxide | 16 | 29 | 46 | 93 |
| Tertiary butylisopropylbenzene hydroperoxide | 37 | 55 | 71 | 97 |
| Dodecylisopropylbenzene hydroperoxide | 31 | 47 | 58 | ------ |
| Triisopropylbenzene hydroperoxide | 32 | 55 | 67 | ------ |

*Example 20*

Ammonium chloride (32.3 parts by weight) was used as an electrolyte in the recipe of Example 9, with potassium caprylate as emulsifier and 200 parts by weight water. A conversion of 31 per cent was obtained in 24 hours. With potassium hexyl sulfate as the emulsifier in this recipe, a conversion of 18 per cent was obtained in 24 hours.

2,615,009

17

*Example 21*

Magnesium chloride (30.2 parts) was used in the recipe of Example 9, with 200 parts of water and potassium hexyl sulfate as the emulsifier. A conversion of 43 per cent was obtained in 24 hours.

As will be evident to those skilled in the art, various modifications of this invention can be made, or followed, in the light of the foregoing disclosure and discussion, without departing from the spirit or scope of the disclosure or from the scope of the claims.

We claim:

1. In a process for the production of synthetic rubber by polymerization in an aqueous emulsion of a monomeric material comprising at least 65 per cent by weight 1,3-butadiene and also styrene at a polymerization temperature below 0° C., the improvement which comprises utilizing as the aqueous medium of said emulsion an aqueous solution containing sodium chloride in an amount between 10 and 30 per cent by weight of water in said solution and such that said medium has a freezing point lower than said polymerization temperature with the relative amount of said aqueous medium such that said emulsion is of the oil-in-water type, and also utilizing potassium caprylate as the emulsifying agent and tertiary butyl mercaptan as the polymer modifying agent.

2. In a process for the production of synthetic rubber by polymerization in an aqueous emulsion of a monomeric material comprising at least 65 per cent by weight 1,3-butadiene and also styrene at a polymerization temperature below 0° C., the improvement which comprises utilizing as the aqueous medium of said emulsion an aqueous solution containing calcium chloride in an amount between 10 and 30 per cent by weight of water in said solution and such that said medium has a freezing point lower than said polymerization temperature with the relative amount of said aqueous medium such that said emulsion is of the oil-in-water type, and also utilizing sodium hexyl sulfate as the emulsifying agent.

3. In a process for the production of synthetic rubber by polymerization in an aqueous emulsion of a monomeric material comprising at least 65 per cent by weight 1,3-butadiene and also styrene at a polymerization temperature below 0° C., the improvement which comprises utilizing as the aqueous medium of said emulsion an aqueous solution containing as a freezing point depressant a member of the group consisting of alkali metal, alkaline earth metal and ammonium salts of hydrochloric acid, nitric acid, sulfuric acid and monobasic aliphatic organic acids having less than five carbon atoms in an amount between 10 and 30 per cent by weight of water in said solution and such that said medium has a freezing point lower than said polymerization temperature with the relative amount of said aqueous medium such that said emulsion is of the oil-in-water type, and also utilizing an emulsifying agent comprising a salt of an aliphatic organic acid having six to ten carbon atoms per molecule.

4. In a process of polymerizing by addition polymerization in aqueous emulsion of a polymerizable unsaturated organic compound which contains the structure $CH_2=C<$ and which undergoes in aqueous emulsion an addition polymerization to form linear polymers of high mo-

18 lecular weight, the improvement which comprises polymerizing such a monomeric material at a polymerization temperature below 5° C. and removing heat during reaction by heat exchange with a cooling medium which is below the freezing point of water, and utilizing as the aqueous medium of said emulsion an aqueous solution of a salt of the group consisting of alkali metal, alkaline earth metal and ammonium salts of hydrochloric acid, nitric acid, sulfuric acid and monobasic aliphatic organic acids having less than five carbon atoms containing said salt in solution in an amount between 10 and 30 per cent by weight of water in said solution, and such that the freezing point of said aqueous medium is below the temperature of said cooling medium, in the presence of one to ten parts by weight per 100 parts of monomeric material of an emulsifying agent which is soluble in said amount in said aqueous solution at said polymerization temperature and will perform the function of a surface active agent under said conditions, said emulsifying agent selected from the group consisting of nonionic emulsifiers and organic anionic emulsifiers containing six to ten carbon atoms, and with the relative amount of said aqueous medium such that said emulsion is of the oil-in-water type.

5. The process of claim 4 in which said salt is an ammonium salt.

6. The process of claim 4 in which said salt is a salt of an alkali metal.

7. The process of claim 4 in which said salt is a salt of an alkaline earth metal.

8. The process of claim 16 in which said salt is sodium chloride.

9. The process of claim 16 in which said salt is calcium chloride.

10. The process of claim 16 in which said salt is ammonium chloride.

11. In a process for the production of synthetic rubber by polymerization in an aqueous emulsion of a monomeric material comprising a conjugated diolefin at a polymerization temperature between −40 and 0° C., the improvement which comprises effecting said polymerization in the presence of a redox polymerization promoter comprising dimethylphenylhydroperoxymethane as oxidant and a separately added ferrous pyrophosphate complex, and utilizing as the aqueous medium of said emulsion an aqueous solution of a salt of the group consisting of alkali metal, alkaline earth metal and ammonium salts of hydrochloric acid, nitric acid, sulfuric acid and monobasic aliphatic organic acids having less than five carbon atoms containing said salt in an amount between 10 and 30 per cent by weight of water in said solution, and such that the freezing point of said aqueous medium is below the reaction temperature in the presence of one to ten parts by weight per 100 parts of monomeric material of an emulsifying agent which is soluble in said amount in said aqueous solution at said polymerization temperature and will perform the function of a surface active agent under said conditions, said emulsifying agent selected from the group consisting of nonionic emulsifiers and organic anionic emulsifiers containing six to ten carbon atoms, and with the relative amount of said aqueous medium such that said emulsion is of the oil-in-water type.

12. The process of claim 11 in which said salt is a chloride and a butyl mercaptan is included in the reaction mixture as a polymer modifier.

13. A process for the production of synthetic rubber which comprises polymerizing a monomeric material comprising a major portion of 1,3- butadiene at a polymerization temperature between 5 and −40° C. while dispersed in an aqueous solution containing a chloride of a cation of the group consisting of ammonium, alkali metals and alkaline earth metals in an amount between 10 and 30 per cent by weight of water in said solution and in the presence of one to ten parts by weight per 100 parts of said monomeric material of an emulsifying agent which is soluble in said amount in said aqueous solution at said polymerization temperature and will perform the function of a surface active agent under said conditions, said emulsifying agent selected from the group consisting of nonionic emulsifiers and organic anionic emulsifiers containing six to ten carbon atoms, and in the presence of a polymerization catalyst composition comprising an organic hydroperoxide as a polymerization initiator.

14. The process of claim 17 in which said salt is a chloride of an alkali metal and said emulsifying agent is a caprylate of an alkali metal.

15. The process of claim 17 in which said salt is sodium chloride and said emulsifying agent is potassium caprylate.

16. In a process of polymerizing by addition polymerization in aqueous emulsion of a polymerizable unsaturated organic compound which contains the structure $CH_2=C<$ and which undergoes in aqueous emulsion an addition polymerization to form linear polymers of high molecular weight, the improvement which comprises polymerizing such a monomeric material at a polymerization temperature below 5° C. and removing heat during reaction by heat exchange with a cooling medium which is below the freezing point of water, and utilizing as the aqueous medium of said emulsion an aqueous solution of a chloride of a cation of the group consisting of ammonium, alkali metals, and alkaline earth metals containing said chloride in solution in an amount between 10 and 30 per cent by weight of water in said solution, and such that the freezing point of said aqueous medium is below the temperature of said cooling medium, in the presence of one to ten parts by weight per 100 parts of monomeric material of an emulsifying agent comprising a salt of an aliphatic organic acid having six to ten carbon atoms per molecule, and with the relative amount of said aqueous medium such that said emulsion is of the oil-in-water type.

17. A process for polymerizing a monomeric material comprising an unsaturated organic compound which contains the structure $CH_2=C<$ and which undergoes in aqueous emulsion an addition polymerization to form linear polymers of high molecular weight, which comprises polymerizing such a monomeric material while dispersed in an aqueous medium at a polymerization temperature below 5° C. and removing heat during reaction by heat exchange with a cooling medium which is below the freezing point of water, and utilizing as said aqueous medium an aqueous solution of a chloride of a cation of the group consisting of ammonium, alkali metals and alkaline earth metals in an amount between 10 and 30 per cent by weight of water in said solution and in the presence of one to ten parts by weight per 100 parts of said monomeric material of an emulsifying agent comprising a salt of an alkali metal and a fatty acid containing six to ten carbon atoms per molecule, and in the presence of a polymerization catalyst composition comprising an organic hydroperoxide as a polymerization initiator.

WILLARD M. ST. JOHN, Jr.
CARL A. URANECK.

REFERENCES CITED

The following references are of record in the file of this patent:

UNITED STATES PATENTS

| Number | Name | Date |
|---|---|---|
| 2,469,017 | Sundet | May 3, 1949 |

OTHER REFERENCES

Troyan: "The Rubber Age," vol. 63, No. 5, August 1948, pp. 585–595.